US010449867B2

(12) United States Patent
Hong et al.

(10) Patent No.: US 10,449,867 B2
(45) Date of Patent: Oct. 22, 2019

(54) SYSTEMS AND METHODS FOR CONNECTING BATTERY STRINGS TO A DC BUS

(71) Applicant: Faraday & Future Inc., Gardena, CA (US)

(72) Inventors: Michael Hong, Gardena, CA (US); Long Huynh, Gardena, CA (US)

(73) Assignee: FARADAY & FUTURE INC., Gardena, CA (US)

(*) Notice: Subject to any disclaimer, the term of this patent is extended or adjusted under 35 U.S.C. 154(b) by 508 days.

(21) Appl. No.: 14/969,644

(22) Filed: Dec. 15, 2015

(65) Prior Publication Data

US 2017/0166075 A1   Jun. 15, 2017

(51) Int. Cl.
| B60L 50/64 | (2019.01) |
| B60L 11/18 | (2006.01) |
| B60L 3/04 | (2006.01) |
| B60L 58/12 | (2019.01) |
| B60L 50/60 | (2019.01) |

(52) U.S. Cl.
CPC ............ *B60L 11/1861* (2013.01); *B60L 3/04* (2013.01); *B60L 50/64* (2019.02); *B60L 50/66* (2019.02); *B60L 58/12* (2019.02); *B60L 2240/547* (2013.01); *B60L 2270/20* (2013.01); *Y02T 10/705* (2013.01); *Y02T 10/7005* (2013.01); *Y02T 10/7044* (2013.01)

(58) Field of Classification Search
CPC .................................................. B60L 11/1861
USPC ......................................................... 320/104
See application file for complete search history.

(56) References Cited

U.S. PATENT DOCUMENTS

| 2002/0167223 | A1* | 11/2002 | Yamazaki | B60L 11/1851 307/9.1 |
| 2005/0068003 | A1* | 3/2005 | Gauthier | B60K 6/445 320/104 |
| 2013/0175857 | A1* | 7/2013 | Shreevani | B60L 3/0023 307/9.1 |
| 2017/0120772 | A1* | 5/2017 | Alser | B60L 11/1803 |

* cited by examiner

*Primary Examiner* — Edward Tso
*Assistant Examiner* — Ahmed H Omar
(74) *Attorney, Agent, or Firm* — Veros Legal Solutions, LLP

(57) ABSTRACT

A method is disclosed for connecting a plurality of battery strings to a direct-current (DC) bus. The method may include sorting the plurality of battery strings in an order based on respective output voltage values of the battery strings. The sorted plurality of battery strings may include, in the order, at least a first battery string and a second battery string. The method may also include connecting the first battery string to a pre-charge circuit. The method may further include pre-charging the DC bus using the first battery string and the pre-charge circuit. The method may further include connecting the first battery string to the DC bus. The method may further include connecting the second battery string to the DC bus.

18 Claims, 4 Drawing Sheets

SYSTEMS AND METHODS FOR CONNECTING BATTERY STRINGS TO A DC BUS

TECHNICAL FIELD

The present disclosure relates generally to a system and method for connecting battery strings to a direct-current (DC) bus, and more particularly, to a system and method for connecting multiple battery strings to a DC bus of a vehicle when the multiple battery strings have different output voltages.

BACKGROUND

Battery-powered vehicles, such as electric vehicles or hybrid electric vehicles, may contain one or more high-voltage battery packs connected to a DC bus. The high-voltage battery pack may be used as the primary power source of a vehicle to drive various primary loads (e.g., traction motors) and various auxiliary loads (e.g., HVAC, lighting, pumps, etc.). To improve the system reliability and availability, the high-voltage battery pack may be configured as multiple battery strings connected to the DC bus in parallel. However, as the number of the battery strings increase, the system complexity also rises. For example, because of the input capacitance of the loads, initial connection of a battery string to the DC bus may generate a severe inrush current that may damage electrical components of the vehicle. The level of the inrush current may be determined by a difference between the output voltage of the battery string and the voltage of the DC bus. Because the battery strings may have different output voltages and the timing of connecting each battery string to the DC bus may be different, a sophisticated system for connecting unbalanced battery strings to the DC bus is needed to limit the inrush current.

The disclosed system is directed to overcoming one or more of the problems set forth above and/or other problems of the prior art.

SUMMARY

Consistent with one disclosed embodiment of the present disclosure, a method is provided for connecting a plurality of battery strings to a direct-current (DC) bus. The method may include sorting the plurality of battery strings in an order based on respective output voltage values of the battery strings. The sorted plurality of battery strings may include, in the order, at least a first battery string and a second battery string. The method may also include connecting the first battery string to a pre-charge circuit. The method may also include pre-charging the DC bus using the first battery string and the pre-charge circuit. The method may further include connecting the first battery string to the DC bus. The method may further include connecting the second battery string to the DC bus.

Consistent with another disclosed embodiment of the present disclosure, a system is provided for connecting a plurality of battery strings to a DC bus. The system may include one or more pre-charge circuits. The system may also include a controller configured to: sort the plurality of battery strings in an order based on respective output voltage values of the battery strings the sorted plurality of battery strings including, in the order, at least a first battery string and a second battery string; connect the first battery string to a pre-charge circuit; pre-charge the DC bus using the first battery string and the pre-charge circuit; connect the first battery string to the DC bus; and connect the second battery string to the DC bus.

Yet another disclosed embodiment of the present disclosure is directed to a method for connecting battery strings to a DC bus. The method may include sorting a plurality of battery strings in an order according to a performance parameter of the battery strings. The plurality of battery strings may include, in the order, a first battery string and a second battery string. The method may also include connecting the first battery string to a pre-charge circuit. The method may also include pre-charging the DC bus using the first battery string and the pre-charge circuit. The method may further include connecting the first battery string to the DC bus. The method may further include connecting the second battery string to the DC bus.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings.

DETAILED DESCRIPTION

For discussion purposes, the principles of the present disclosure are described in connection with the exemplary vehicle depicted in FIG. 1. Those skilled in the art will recognize that the principles of the present disclosure may be applied in any types of vehicle or machine to connect battery strings to a DC bus.

Figure 1:
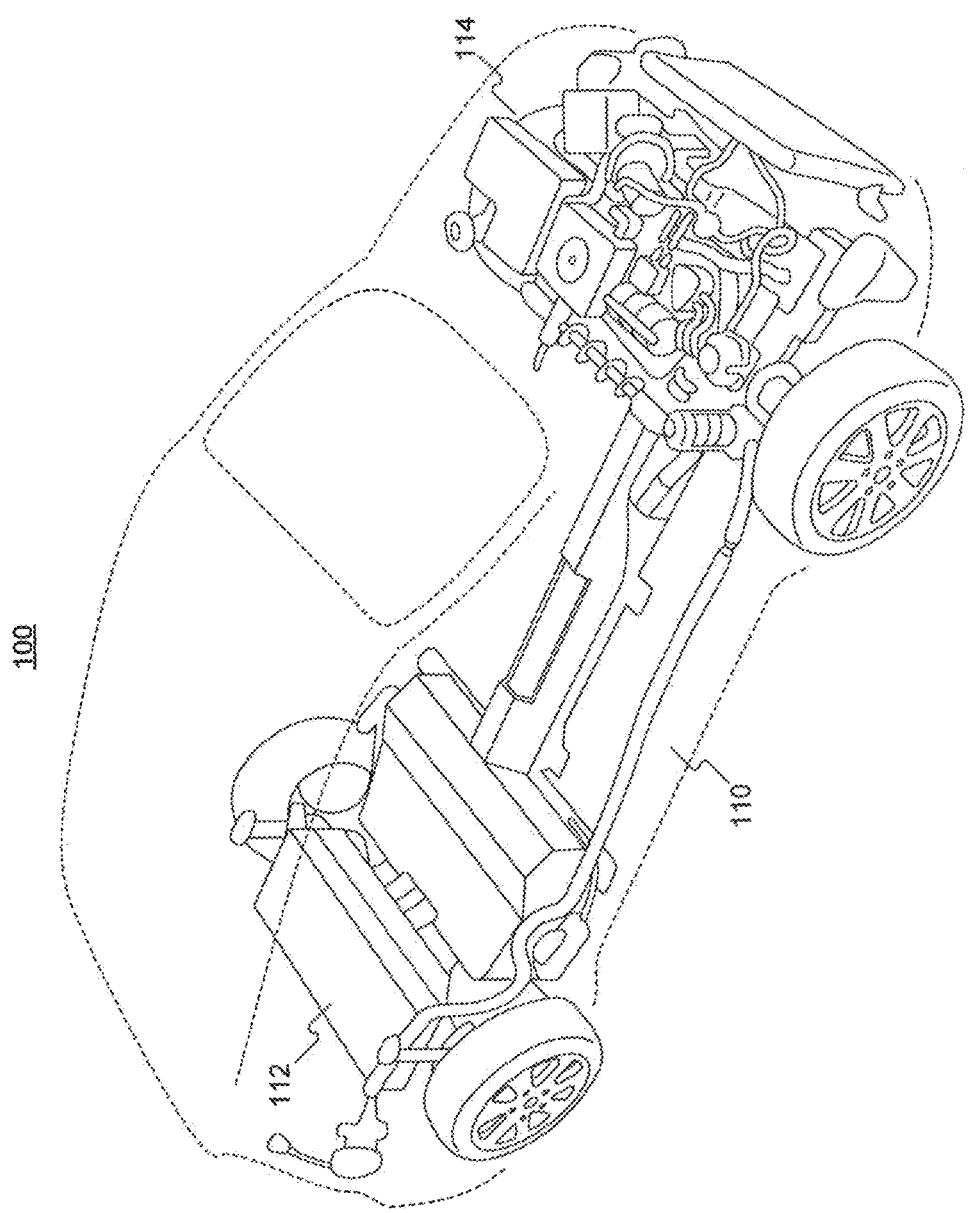
FIG. 1 is a schematic illustration of an exemplary vehicle including a system for connecting multiple battery strings to a DC bus.

FIG. 1 is a schematic diagram illustrating a partial view of an exemplary vehicle 100. FIG. 1 will be described using an electric vehicle as an exemplary embodiment of vehicle 100, but vehicle 100 may be other types of vehicles. For example, vehicle 100 may be a vehicle at least partially powered by electrical power, such as a hybrid vehicle. Vehicle 100 may have any body style, such as a sedan, a coupe, a sports car, a truck, a station wagon, an SUV, a minivan, or a conversion van. Referring to FIG. 1, vehicle 100 may include a power train 110 (illustrated by the solid lines in FIG. 1), which may further include one or more high-voltage battery packs 112 and an electric drive system 114 connected to a common DC bus.

Although FIG. 1 shows battery packs 112 located in the chassis and toward the rear of vehicle 100, battery packs 112 may be located in any other compartment of vehicle 100 such as, for example, within the hood area, or distributed evenly in the chassis. Battery packs 112 may include a plurality of high-voltage battery strings connected in parallel. Each battery string may further include multiple battery cells connected in series or in parallel. Each battery string may supply high-voltage DC, e.g., 400V, to electric drive system 114. Vehicle 100 may use multiple battery strings connected in parallel to improve system reliability and power availability. The parallel configuration of the battery strings may help to ensure that the connection or disconnection of one battery string with a DC bus of vehicle 100 does not significantly affect the operation of other battery strings. Thus, each battery string may operate independently of the others, facilitating continued vehicle operation notwithstanding a failure of one or more of the other battery strings.

Battery packs 112 may be associated with a battery management system (BMS, not shown) for managing the usage and charging of the battery strings in a safe and reliable manner. The BMS may include several functional modules dedicated to various tasks. Particularly, the BMS may include one or more modules configured to monitor the battery state of charge (SOC) and state of health (SOH). For example, as the battery cells within a battery string may have different capacities, the battery cells' SOC may gradually deviate from each other over multiple charge and discharge cycles. Without close monitoring and periodical balancing of the SOC of the battery cells, some battery cells may be driven into deep discharge, leading to damage, and eventually complete battery string failure. Moreover, unbalanced battery cells may cause the plurality of battery strings to have different output voltages, which calls for special care in connecting the battery strings to the DC bus. Consequently, the BMS may constantly monitor the output voltage of each battery string, voltages of individual cells in the battery string, current in and/or out of the battery string, etc. As described below, such information, together with information about the conditions of the DC bus, may be used to manage the connection of the battery string to the DC bus.

Electric drive system 114 may include various loads and control units, such as an electric motor with power electronics (e.g., an inverter system) and cooling system, a transmission including the differential gear, a brake system, a high-voltage air conditioning for vehicle interior climate control, and the like. For example, when vehicle 100 is accelerating or maintaining a constant speed, the inverter system may convert the DC supplied by battery packs 112 into an alternating current (AC) for driving the electric motors. However, when vehicle 100 is operating in a regenerative-braking mode, the electric motor may operate as a generator that outputs AC, which is converted by the inverter system into DC for charging battery pack 112 and/or driving other loads of power train 110.

Electric drive system 114 may include numerous load capacitors serving various purposes. For example, the inverter system may use filter capacitors to remove undesirable frequencies. As another example, large integrated capacitors may be provided in vehicle 100 to power one or more loads. Therefore, electric drive system 114 may have a large input capacitance.

To prevent severe inrush current upon initial connection of battery packs 112 to electric drive system 114, the BMS may include one or more pre-charge circuits (not shown) to pre-charge the load capacitors. In some exemplary embodiments, the BMS may provide one pre-charge circuit for each battery string respectively. Each pre-charge circuit may include a high power contactor or relay to switch high voltages. However, because the contactors contain moving parts and are bulky components, they may be difficult to package in the limited space of vehicle 100, and may leave little room for other parts and components. Therefore, in preferred embodiments consistent with the present disclosure, the contactor or relay in the pre-charge circuit may be replaced with a power transistor. The compact size of the transistor may offer more flexibility in packaging.

Figure 2:
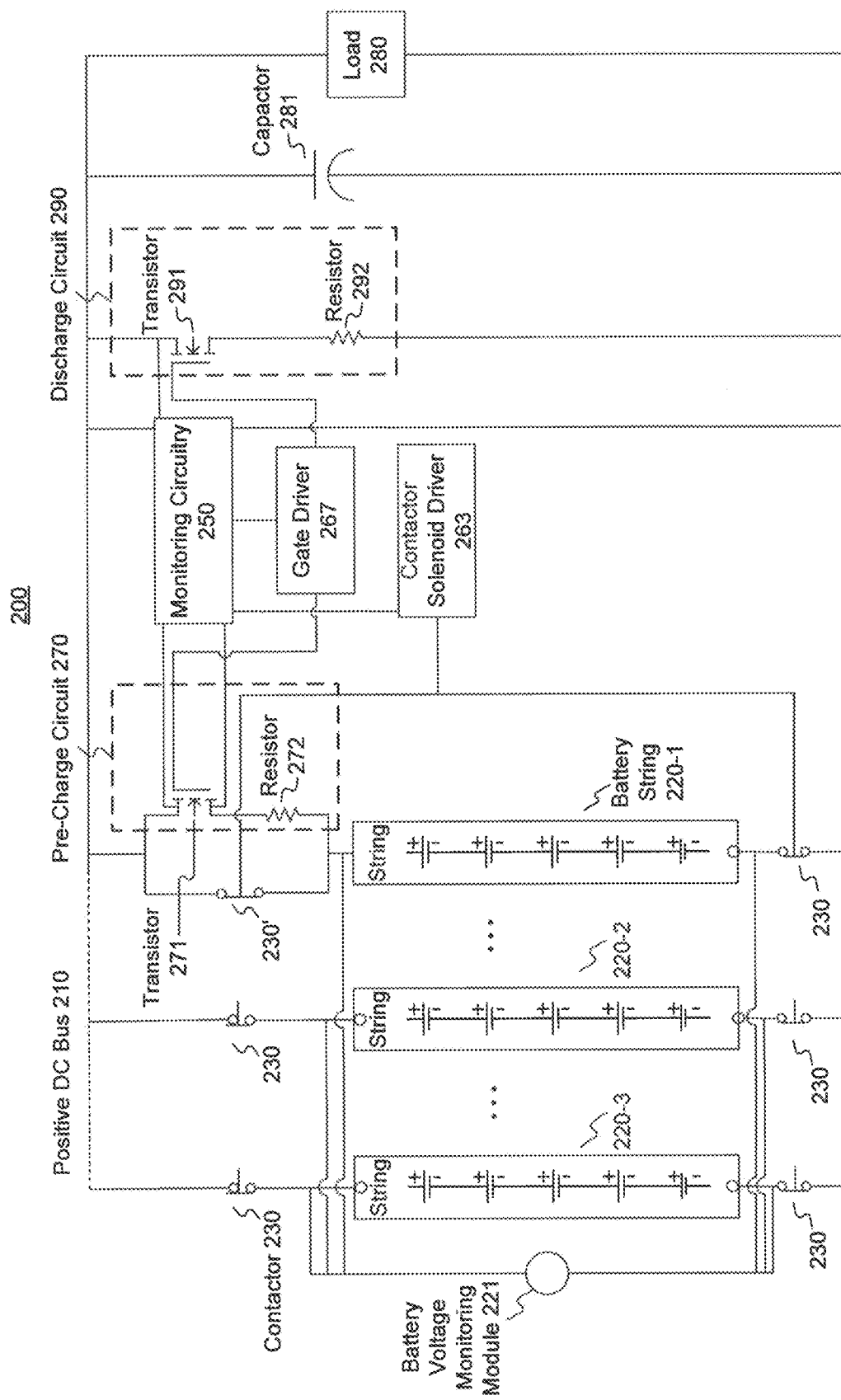
FIG. 2 is a schematic diagram illustrating an exemplary circuit used in the vehicle illustrated in FIG. 1, according to an exemplary embodiment.

FIG. 2 is a schematic diagram of an exemplary circuit 200 for connecting multiple battery strings to a DC bus, according to an exemplary embodiment. For example, circuit 200 may be used in vehicle 100 illustrated in FIG. 1. Referring to FIG. 2, circuit 200 may include a DC bus 210, a plurality of high-voltage battery strings 220, a battery voltage monitoring module 221, a plurality of contactors 230, monitoring circuitry 250, a contactor solenoid driver 263, one or more gate drivers 267, one or more pre-charge circuits 270, various loads 280, load capacitors 281, and a discharge circuit 290.

DC bus 210 may include positive and negative power lines that electrically connect various components of a power train of vehicle 100, such as high-voltage battery strings 220, loads 280, and load capacitors 281, which may be similar to the above-described high-voltage battery packs 112 and electric drive system 114.

The plurality of battery strings 220, such as battery strings 220-1, 220-2, 220-3, may have different output voltage levels. This voltage disparity may be created by design and/or caused by unbalance of the battery cells, and may widen as the battery strings age and/or old battery strings are replaced by new battery strings. Consistent with the present disclosure, battery strings 220 may be connected to DC bus 210 in an order determined by their respective values of a performance parameter of battery strings 220, such as an output voltage level or a maximum power output. For example, such order may be an ascending order or a descending order of the respective output voltage levels. As another example, the battery strings may be sorted such that the combination of the battery strings provide a maximum power output. Moreover, when having the same output voltage levels, battery strings 220 may be connected to DC bus 210 simultaneously or in a randomly assigned order.

As part of a BMS of vehicle 100, battery voltage monitoring module 221 may include one or more voltage meters configured to closely monitor the output voltage of each battery string 220. The battery voltage monitoring module 221 may measure the voltage of each cell within a battery string 220 to determine the overall output voltage of the battery string. Alternatively, the battery voltage monitoring module 221 may measure the output voltage at the terminals of each battery string 220. Battery voltage monitoring module 221 may be communicatively connected to a controller and report the measured output voltage levels to the controller for sorting battery strings 220 in an order.

Each high-voltage battery string 220 may be paired with switching devices, such as contactors 230, to connect and/or disconnect battery string 220 with DC bus 210 under different conditions. For example, if an operator of vehicle 100 turns on the vehicle, this closes contactors 230, i.e., connects battery strings 220 to DC bus 210, and activates other operation systems. Also, for example, vehicle 100 may only need to run on some of the battery strings 220. However, when more power is needed, vehicle 100 may connect additional battery strings 220 to DC bus 210 by closing the respective contactors 230.

Each high-voltage battery string 220 may be paired with two contactors 230, including one contactor 230 configured to connect (contactor closed) or disconnect (contactor open) a positive terminal of battery string 220, and the other contactor 230 configured to connect or disconnect a negative terminal of battery string 220. As such, battery string 220 may be completely separated from the vehicle electric system when both contactors 230 are opened. Conversely, battery strings 220 may be connected to DC bus 210 in an order by closing the respective pairs of contactors 230 in the order.

Each contactor 230 may be a high power contactor including a movable contact and a fixed contact. The movable contact may be mechanically coupled to an armature associated with a coil. The coil may be further connected to contactor solenoid driver 263. When contactor solenoid driver 263 energizes the coil, a magnetic field may be induced in the coil. The magnetic field may interact with the metallic material in the armature and causes movement of the armature and the movable contact. Thus, contactor solenoid driver 263 may control the closing and opening of contactor 230. Although FIG. 2 shows a contactor solenoid driver 263 connected with a pair of contactors 230, other contactors 230 may be connected to and controlled by the same or different contactor solenoid driver 263.

Although FIG. 2 only shows one pre-charge circuit 270, each battery string 220 may be connected with its own pre-charge circuit 270. In exemplary embodiments, before each battery string 220, or at least the first battery string among a group of ordered battery strings 220, is connected to DC bus 210, a corresponding pre-charge circuit 270 may be connected to pre-charge load capacitors 281, so as to limit the inrush current.

Pre-charge circuit 270 may be placed at the positive terminal or the negative terminal of battery string 220. Each pre-charge circuit 270 may be connected to a first contactor 230 in series, and to a second contactor 230' in parallel. In exemplary embodiments, pre-charge circuit 270 may include a pre-charge transistor 271, or a combination of both pre-charge transistor 271 and a pre-charge resistor 272.

Pre-charge transistor 271 may be a high power transistor, such as a metal-oxide-semiconductor field-effect transistor (MOSFET), or an insulated gate bipolar transistor (IGBT). Each pre-charge transistor 271 is connected to gate driver 267 that can switch on and off pre-charge transistor 271, and/or control pre-charge transistor 271 in the linear region. Although FIG. 2 shows the connection between one pre-charge transistor 271 and gate driver 267, other pre-charge transistors 271 may be connected to and controlled by the same or different gate driver 267. During normal operation of battery string 220 and/or when vehicle 100 is turned off, gate driver 267 may switch off pre-charge transistor 271 to prevent current from flowing through pre-charge circuit 270. However, during pre-charging of load capacitors 281, gate driver 267 may switch on pre-charge transistor 271 to allow inrush current flowing through pre-charge circuit 270.

Various considerations may be given to select proper pre-charge transistor 271 for use in circuit 200. Pre-charge transistor 271 may have a high current rating (i.e., $I_D$ of a MOSFET, and $I_C$ of an IGBT) to allow high inrush current to flow when transistor 271 is switched on and battery string 220 is pre-charging capacitors 281. Furthermore, pre-charge transistor 271 may also have a high voltage rating (i.e., $V_{DSS}$ of a MOSFET, and $V_{CES}$ of an IGBT) and be capable of blocking a voltage as high as the full bus voltage when transistor 271 is switched off. The current rating and voltage rating should leave a sufficient margin to account for voltage and current spikes, which are common in vehicle electric systems. In some embodiments, a plurality of transistors, either as discrete components or integrated together in a power module, can be used to switch high currents. For example, multiple MOSFETs may be connected in parallel to increase the current handling and efficiency.

When inrush current flows through pre-charge circuit 270, the presence of pre-charge resistor 272 may limit the level of the inrush current. The resistance of pre-charge resistor 272 may be chosen based on the total capacitance of capacitors 281 and the time for pre-charging capacitors 281.

Circuit 200 may also include monitoring circuitry 250 configured to detect the voltage of DC bus 210. Monitoring circuitry 250 may be connected to contactor solenoid driver 263 and gate driver 267. During pre-charging of load capacitors 281, after detecting that the voltage of DC bus 210 reaches a steady state, monitoring circuitry 250 may send signals to contactor solenoid driver 263 and gate driver 267 to close contactors 230 and switch off pre-charge transistor 271, respectively. In this exemplary manner, the pre-charge phase may be completed and battery string 220 may be fully connected to DC bus 210.

In some embodiments, to protect pre-charge transistor 271 from overvoltage, monitoring circuitry 250 may be further configured to detect the voltage across pre-charge transistor 271. When pre-charge transistor 271 is switched on and a large amount of inrush current flows through pre-charge transistor 271, a desaturation mechanism may be used to ensure that the maximum saturation limit of pre-charge transistor 271 is not reached. For example, if the voltage across pre-charge transistor 271 approaches or exceeds $V_{DS(sat)}$ of a MOSFET or $V_{BE(sat)}$ of an IGBT, monitoring circuitry 250 may trigger gate driver 267 to switch pre-charge transistor 271 off immediately or with a minimal delay, and/or trigger contactor solenoid driver 263 to open the first contactor 230 instantly or with a minimal delay.

Because pre-charge transistor 271 in its off state may produce a leakage current, circuit 200 may further include a discharge circuit 290 connected to DC bus 210 and configured to remove the leakage current after battery string 220 is disconnected from DC bus 210. Discharge circuit 290 may include a discharge transistor 291 and a discharge resistor 292 connected in series. Discharge transistor 291 may be a power transistor similar to pre-charge transistor 271. Discharge transistor 291 may be connected to and controlled by gate driver 267. In exemplary embodiments, after vehicle 100 is turned off, gate driver 267 may switch on discharge transistor 291 to allow the leakage current to flow through discharge resistor 292 and dissipate as heat. In contrast, during normal operations of battery string 220 or when pre-charge transistor 271 is switched on, discharge transistor 291 may be switched off to prevent power loss. Monitoring circuitry 250 may be further configured to detect the leakage current flowing through discharge circuit 290. When the leakage current has reduced to approximately zero, monitoring circuitry 250 may send signals to gate driver 267 to switch off discharge transistor 291.

Figure 3:
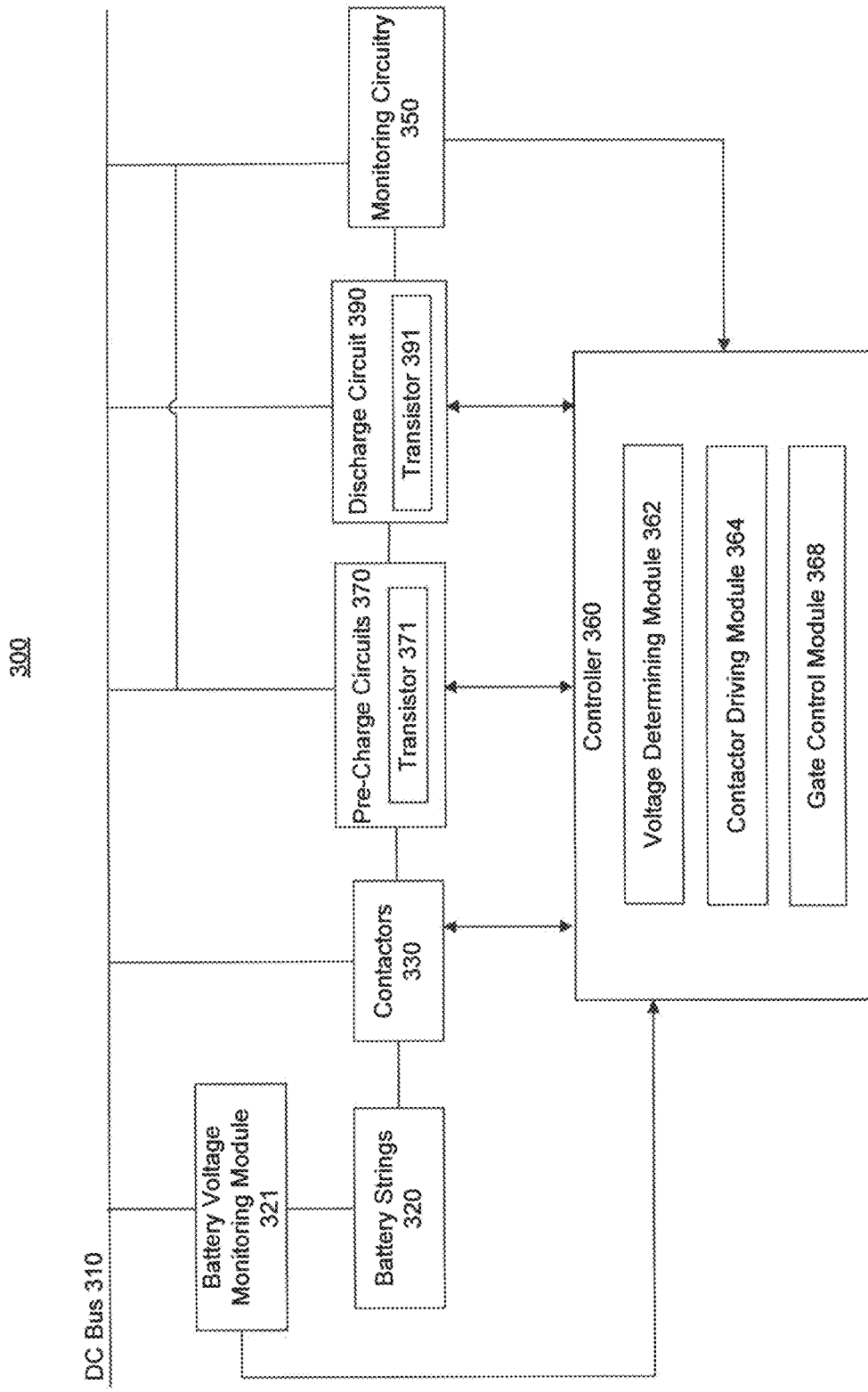
FIG. 3 is a block diagram of a system for connecting multiple battery strings to a DC bus, consistent with the circuit illustrated in FIG. 2.

FIG. 3 is a block diagram of an exemplary system 300 for connecting multiple battery strings 320, including, e.g., battery strings 320-1, 320-2, and 320-3 (not shown), to a DC bus 310, consistent with circuit 200 illustrated in FIG. 2. For example, system 300 may be used in vehicle 100 illustrated in FIG. 1. Referring to FIG. 3, system 300 may include a battery voltage monitoring module 321, a plurality of contactors 330, monitoring circuitry 350, a controller 360, one or more pre-charge circuits 370 (including, e.g., pre-charge circuits 370-1, 370-2, and 370-3 associated with battery strings 320-1, 320-2, and 320-3, respectively), and a discharge circuit 390.

Consistent with FIG. 2, the structures and functions of DC bus 310, battery strings 320, battery voltage monitoring module 321, contactors 330, monitoring circuitry 350, pre-charge circuits 370, and discharge circuit 390 may be similar to the structures and functions of DC bus 210, battery strings 220, battery voltage monitoring module 221, contactors 230, monitoring circuitry 250, pre-charge circuits 270, and discharge circuit 290, respectively.

Controller 360 may be configured to determine the output voltage levels of battery strings 320 and control the connection of each battery string 320 to DC bus 310 based on the output voltage levels. If battery strings 320 are unbalanced, i.e., have different output voltage levels, controller 360 may sort battery strings 320 in an order determined by the respective output voltage levels and/or any other performance parameters of battery strings 320, for example, the respective maximum power outputs. Controller 360 may then connect battery strings 320, one after another, to DC bus 310 according to the determined order. At least before the connection of the first battery string 320, controller 360 may use the corresponding pre-charge circuit 370, in combination with discharge circuit 390, to pre-charge DC bus 310. Alternatively, controller 360 may perform the pre-charge before connecting each battery string 310.

Controller 360 may take many forms, including, for example, a computer-based system, a microprocessor-based system, a microcontroller or microprocessor operatively coupled with a memory, an electronic control module (ECM), an electronic control unit (ECU), or any other suitable control circuit or system. Controller 360 may also include one or more of an application-specific integrated circuit (ASIC), a field-programmable gate array (FPGA), and a logic circuit configured to allow controller 360 to function in accordance with the disclosed embodiments. In some embodiments, controller 360 is specially configured with hardware and/or software modules for performing functions of system 300. For example, controller 360 may include a voltage determining module 362, a contactor driving module 364, and a gate control module 368. The modules may be implemented as specialized circuitry integrated within controller 360, and/or specialized software/firmware executable by controller 360. Functions of the modules are discussed in further detail with respect to FIG. 4.

In exemplary embodiments, controller 360 may include one or more of the following components (not shown): a memory, a processing component such as a microcontroller or microprocessor operatively coupled with the memory, a storage device, an input/output (I/O) interface, and a communication component.

The processing component may be configured to receive signals from other electronics onboard or offboard vehicle 100 and process the signals to determine one or more operation conditions of system 300. For example, the processing component may receive the measured output voltage levels from battery voltage monitoring module 321 and sort battery strings 320 in an order based on respective values of a performance parameter of battery strings 320, such as the output voltage levels and/or maximum power outputs. The processing component may be further configured to generate and transmit a control signal via, for example, the I/O interface, to connect battery strings 320 to DC bus 310. For example, the processing component may generate signals to control the timing of closing respective contactors 330, so as to connect battery strings 320 to DC bus 310 in the sorted order. In operation, the processing component may execute computer instructions stored in the memory and/or storage device. For example, the processing component may execute computer instructions to coordinate the operations of pre-charge circuits 370 and discharge circuit 390, so as to pre-charge DC bus 310.

The memory and the storage device may include any proper type of storage medium. The memory may include a non-transitory computer-readable storage medium including instructions for applications or methods executable by the processing component. The memory may also store data used for connecting battery strings 320 to DC bus 310, such as the output voltage value of each battery string 320, the input capacitance of the loads, etc. For example, the non-transitory computer-readable storage medium may be a read-only memory (ROM), a random access memory (RAM), a flash memory, a memory chip (or integrated circuit), or the like. The storage device may include a volatile or non-volatile, magnetic, semiconductor, tape, optical, removable, nonremovable, or other type of storage device or computer-readable medium to provide additional storage space for controller 360.

The I/O interface may include one or more digital and/or analog communication devices that allow controller 360 to communicate with other systems and devices. For example, the I/O interface may receive signals from battery voltage monitoring module 321 that are indicative of the output voltage value of each battery string 320, and send the signals to the processing component for further processing. The I/O interface may also receive one or more control signals from the processing component, and send the control signals to contactors 330, pre-charge circuits 370, and/or discharge circuit 390 for connecting battery strings 320 to DC bus 310.

The communication component may be configured to facilitate communication, wired or wirelessly, between controller 360 and other devices, including the BMS and/or a user interface. The communication component may access a wireless network based on one or more communication standards, such as WiFi, LTE, 2G, 3G, 4G, 5G, etc. In one exemplary embodiment, the communication component includes a near field communication (NFC) module to facilitate short-range communications between controller 360 and other devices. In other embodiments, the communication component may be implemented based on a radio frequency identification (RFID) technology, an infrared data association (IrDA) technology, an ultra-wideband (UWB) technology, Bluetooth (BT) technology, or other technologies.

Figure 4:
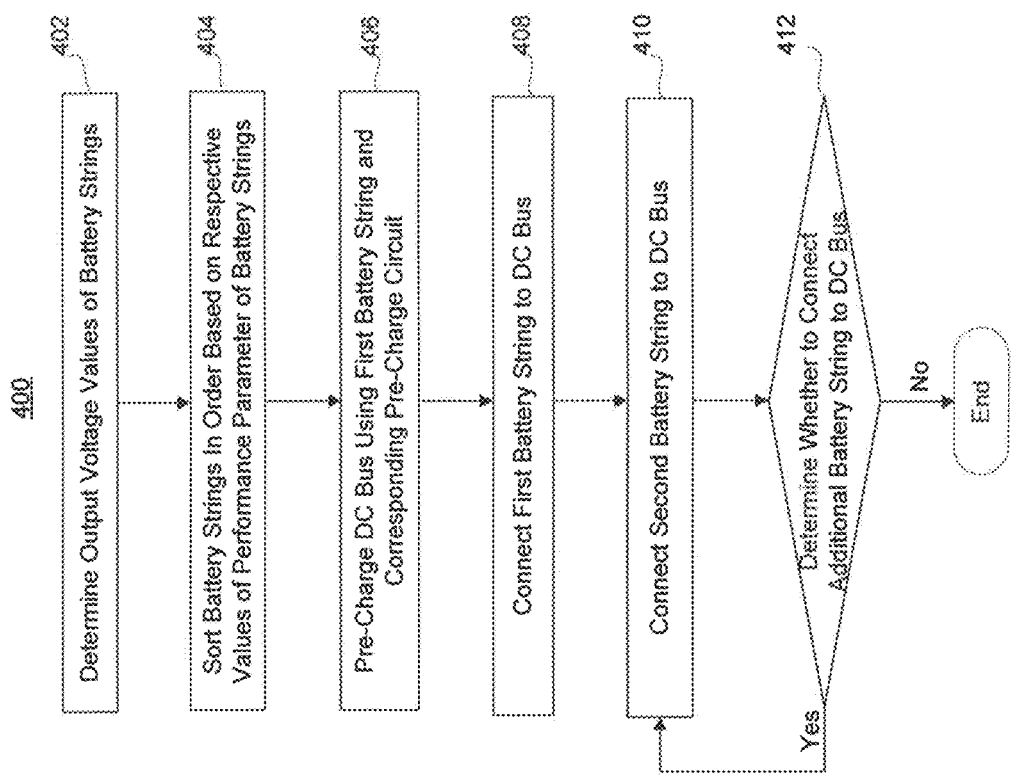
FIG. 4 is a flowchart of a method of performed by the system shown in FIG. 3.

FIG. 4 is a flowchart of an exemplary method 400 for connecting multiple battery strings to a DC bus. For example, method 400 may be performed by system 300. System 300 may determine the output voltage of each battery string and sort the battery strings in an order based on the respective output voltage values, such as an ascending order or a descending order of the respective output voltage values. System 300 may then connect the battery string to the DC bus in the sorted order. In particular, system 300 may connect at least the first battery string using a pre-charge circuit. Operation of exemplary system 300 will now be described in connection with FIG. 4.

In step 402, controller 360 may determine the output voltage values of battery strings 320. When vehicle 100 is turned on, voltage determining module 362 may obtain the output voltage of each active battery string 320. For example, battery voltage monitoring module 321 may measure the output voltage of the each battery string 320 and report the same to controller 360. Alternatively, controller 360 may retrieve from its memory the output voltage values that are measured before vehicle 100 is last turned off.

Voltage determining module 362 may then determine whether battery strings 320 are in a balanced state, i.e., have substantially the same output voltage. If the differences among the output voltages are within a predetermined threshold value, for example, 1V, voltage determining module 362 may determine that battery strings 320 are in a balanced state and controller 360 may connect battery strings 320 to DC bus 310 simultaneously or in a random order. Otherwise, voltage determining module 362 may determine that battery strings 320 are unbalanced and controller 360 may proceed to step 404.

In step 404, controller 360 may sort battery strings 320 in an order based on the respective values of a performance parameter of battery strings 320. The performance parameter may be an output voltage, a maximum power output of battery strings 320, or any other suitable parameters. For illustration purpose only, the following description assumes battery strings 320 are sorted in an order based on the output voltage levels. For example, voltage determining module 362 may sort battery strings 320 in an ascending order of the respective output voltage values, or a descending order of the respective voltage values. If a sub-group of battery strings 320 have substantially the same output voltage value, voltage determining module 362 may assign a random order or the same order to the members of the sub-group. For example, if a sub-group of battery strings 320 have approximately equal output voltage values, for example, with a difference less than 1V, voltage determining module 362 may assign the same order to the members of the sub-group. For illustrative purpose only, the rest of the description of method 400 assumes battery strings 320 are sorted in the order of battery strings 320-1, 320-2, 320-3, and so on.

In some exemplary embodiments, before the sorting, voltage determining module 362 may evaluate the state of unbalance of battery strings 320 based on the output voltage values. Typically, parallel battery strings may be connected to the same DC bus even if their output voltage levels are different. However, the voltage disparity should be kept below a calibrated threshold to ensure the proper functioning of vehicle 100. This is because as the voltage disparity increases, adverse effects, such as current circulation and unbalanced battery usage, may quickly intensify. Therefore, voltage determining module 362 may determine whether all the active battery strings 320 are suitable to be connected to DC bus 310 based on their voltage disparity. If the output voltage level of a battery string deviates from the rest of battery strings above a predetermined extent, voltage determining module 362 may determine the battery string is not suitable for connection. For example, if the output voltages of three parallel battery strings are 370V, 390V, and 396V, respectively, voltage determining module 362 may determine that only the two battery strings with 390V and 396V are suitable to be connected to DC bus 310, and thus only sort these two battery strings.

In step 406, controller 360 may pre-charge DC bus 310 using the first battery string 320-1 and the corresponding pre-charge circuit 370-1. Specifically, controller 360 may initiate the pre-charge by connecting the first battery string 320-1, among the sorted battery strings, to a corresponding pre-charge circuit 370-1. Before the first battery string 320-1 is connected to DC bus 310, both contactors 330-1 associated with the first battery string 320-1 may stay open to isolate the first battery string 320-1 from the rest of vehicle 100. To connect pre-charge circuit 370-1, contactor solenoid driver 363 may close the first contactor 330-1 that is connected to pre-charge circuit 370-1 in series, and leave open the second contactor 330-1' that is connected to pre-charge circuit 370-1 in parallel.

Subsequently, controller 360 may decrease a first impedance of pre-charge circuit 370-1 and increase a second impedance of discharge circuit 390. Gate control module 368 may adjust the first impedance and second impedance by switching on or off pre-charge transistor 371-1 and discharge transistor 391, respectively. To start the pre-charge process, gate control module 368 may switch on pre-charge transistor 371-1 to allow the inrush current flow through pre-charge circuit 370-1. Resistors included in pre-charge circuit 370-1 may limit the inrush current to a desirable level. In some exemplary embodiments, gate control module 368 may also control pre-charge transistor 371-1 in the linear region to further increase and/or decrease the first impedance, so as to adjust the pre-charge time and control the inrush current level.

Gate control module 368 may also increase the second impedance by switching off discharge transistor 391. The increased second impedance may prevent the inrush current from being dissipated by discharge circuit 390, so as to limit energy loss and shorten the pre-charge time.

During the pre-charge phase, monitoring circuitry 350 may constantly monitor the voltage of DC bus 310. After the voltage reaches a steady state, which indicates that the pre-charging has completed, controller 360 may proceed to step 408.

In step 408, controller 360 may connect the first battery string 320-1 to DC bus 310. After the voltage of DC bus 310 reaches a steady state, monitoring circuitry 350 may send signals to contactor solenoid driver 363 to trigger the closing of the second contactor 330-1' that is connected to pre-charge circuit 370-1 in parallel. As a result, both contactors 330-1 are closed and the first battery string 320-1 is fully connected to DC bus 310. To reduce energy loss in pre-charge circuit 370-1, gate control module 368 may switch off pre-charge transistor 371-1 to further prevent the current from flowing through pre-charge circuit 370-1.

In step 410, controller 360 may connect the second battery string 320-2, among the sorted battery strings, to DC bus 310. Since the load capacitors have already been pre-charged by the first battery string 320-1, controller 360 may connect the second battery string 320-2 to DC bus 310 without using a pre-charge circuit 370. For example, if in step 404 battery strings 320 are sorted in the descending order of the respective voltage values, the connection of the second battery string 320-2 may not change the charging state of the load capacitors and thus may not cause the inrush current. Because connection of the subsequent battery strings 320 does not require the pre-charging step, sorting battery strings 320 in the descending order of the respective voltage values may increase the overall speed of connecting battery strings 320.

As another example, voltage determining module 321 may compute a difference in output voltage values of the first battery string 320-1 and the second battery string 320-2. Such difference may determine the inrush current that will be caused by the connection of the second battery string 320-2. If the difference exceeds a predetermined threshold, which corresponds to a high inrush current, controller 360 may repeat steps 406-408 to connect the second battery string 320-2 using its corresponding pre-charge circuit 370-2. Otherwise, controller 360 may directly connect the second battery string 320-2 to DC bus 310 by closing the associated contactors 330-2, without pre-charging the load capacitors.

In step 412, controller 360 may determine whether there are additional battery strings 320 to be connected to DC bus 310. If yes, controller 360 may repeat step 412 until all the remaining battery strings 320 are connected to DC bus 310. Method 400 ends when all battery strings suitable to connect are connected to DC bus 310.

As described in step 404, battery strings 320 with the same or approximately equal output voltage values may be assigned the same order. Method 400 may treat battery strings 320 in the same order identically. Therefore, each of the terms "first battery string" and "second battery string" may mean more than one battery strings 320 in the same order. Consistently, controller 360 may connect battery strings 320 in the same order at substantially the same time.

The above-disclosed system provides a viable and flexible solution to connect multiple unbalanced battery strings to a DC bus. The system may connect the battery strings to the DC bus in either an order of ascending output voltage values or an order of descending output voltage values. In the case of ascending order, because the voltage of the DC bus is increased incrementally, the system may reduce the peak value of the harmful inrush current. In the case of descending order, because the pre-charging step may only be needed for the first battery string, the system may achieve fast connection of all the battery strings.

It will be apparent to those skilled in the art that various modifications and variations can be made to the disclosed systems and methods. Other embodiments will be apparent to those skilled in the art from consideration of the specification and practice of the present disclosure. It is intended that the specification and examples be considered as exemplary only, with a true scope being indicated by the following claims and their equivalents.

What is claimed is:

1. A method for connecting a plurality of battery strings to a direct-current (DC) bus, the method comprising:
   sorting the plurality of battery strings in an order based on respective output voltage values of the battery strings, the sorted plurality of battery strings including, in the order, at least a first battery string and a second battery string;
   connecting the first battery string to a pre-charge circuit;
   pre-charging the DC bus using the first battery string and the pre-charge circuit;
   connecting the first battery string to the DC bus; and connecting the second battery string to the DC bus;
   wherein pre-charging the DC bus further comprises:
   decreasing a first impedance of the pre-charge circuit; and increasing a second impedance of a discharge circuit connected to the DC bus.

2. The method of claim 1, wherein the plurality of battery strings are sorted in an ascending order of the respective output voltage values.

3. The method of claim 1, wherein the plurality of battery strings are sorted in a descending order of the respective output voltage values.

4. The method of claim 1, further comprising measuring the output voltage values of the plurality of battery strings before the sorting.

5. The method of claim 1, further comprising: determining a difference in output voltage values of the first battery string and the second battery string; and if the difference exceeds a predetermined threshold, pre-charging the DC bus before connecting the second battery string.

6. The method of claim 1, further comprising: determining that two battery strings have approximately equal output voltage values; and connecting the two battery strings to the DC bus at substantially the same time.

7. The method of claim 1, wherein connecting the first battery string to the DC bus further comprises: closing one or more contactors between the first battery string and the DC bus.

8. The method of claim 1, further comprising: increasing the first impedance after a DC bus voltage reaches a steady state.

9. A system for connecting a plurality of battery strings to a DC bus, the system comprising:
   one or more pre-charge circuits; and
   a controller configured to:
      sort the plurality of battery strings in an order based on respective output voltage values of the battery strings, the sorted plurality of battery strings including, in the order, at least a first battery string and a second battery string;
      connect the first battery string to a pre-charge circuit;
      pre-charge the DC bus using the first battery string and the pre-charge circuit;
      connect the first battery string to the DC bus;
      connect the second battery string to the DC bus;
      decrease a first impedance of the pre-charge circuit; and
      increase a second impedance of a discharge circuit connected to the DC bus.

10. The system of claim 9, wherein the controller is further configured to sort the plurality of battery strings in an ascending order of the respective output voltage values.

11. The system of claim 9, wherein the controller is further configured to sort the plurality of battery strings in a descending order of the respective output voltage values.

12. The system of claim 9, further comprising a voltage meter configured to measure the output voltage values of the plurality of battery strings before the sorting.

13. The system of claim 9, wherein the controller is further configured to: determining a difference in output voltage values of the first battery string and the second battery string; and if the difference exceeds a predetermined threshold, pre-charging the DC bus before connecting the second battery string.

14. The system of claim 9, wherein the controller is further configured to: determining that two battery strings have approximately equal output voltage values; and connecting the two battery strings to the DC bus at substantially the same time.

15. The system of claim 9, wherein the controller is further configured to: increasing the first impedance after a DC bus voltage reaches a steady state; and decreasing the second impedance.

16. The system of claim 9, wherein: the pre-charge circuit comprises a first transistor; and the discharge circuit comprises a second transistor, wherein the controller is further configured to: operate the first transistor to change the first impedance; and operate the second transistor to change the second impedance.

17. A method for connecting battery strings to a direct-current (DC) bus, the method comprising:
   sorting a plurality of battery strings in an order according to a performance parameter of the battery strings, the plurality of battery strings including, in the order, a first battery string and a second battery string;
   connecting the first battery string to a pre-charge circuit;
   pre-charging the DC bus using the first battery string and the pre-charge circuit;
   connecting the first battery string to the DC bus;
   connecting the second battery string to the DC bus;
   decreasing a first impedance of the pre-charge circuit; and
   increasing a second impedance of a discharge circuit connected to the DC bus.

18. The method of claim 17, wherein the performance parameter is at least one of an output voltage or a maximum power output of the battery strings.

\* \* \* \* \*